(12) United States Patent
Yoon et al.

(10) Patent No.: US 12,056,048 B2
(45) Date of Patent: Aug. 6, 2024

(54) SYSTEM AND METHOD FOR MANAGEMENT OF ELECTRONIC MEMORY

(71) Applicant: SAMSUNG ELECTRONICS CO., LTD., Suwon-si (KR)

(72) Inventors: Jin Myung Yoon, Yongin-si (KR); Young Min Lee, Seoul (KR); Jung Hwa Lee, Suwon-si (KR); Seon Woo Koo, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 73 days.

(21) Appl. No.: 17/872,167

(22) Filed: Jul. 25, 2022

(65) Prior Publication Data

US 2023/0141409 A1   May 11, 2023

(30) Foreign Application Priority Data

Nov. 11, 2021 (KR) .................. 10-2021-0154782
Dec. 30, 2021 (KR) .................. 10-2021-0193333

(51) Int. Cl.
*G06F 12/02* (2006.01)

(52) U.S. Cl.
CPC ...... *G06F 12/0292* (2013.01); *G06F 12/0246* (2013.01); *G06F 2212/1016* (2013.01)

(58) Field of Classification Search
CPC ............. G06F 12/0292; G06F 12/0246; G06F 2212/1016; G06F 12/0238; G06F 2212/7201; G06F 2212/7208
See application file for complete search history.

(56) References Cited

U.S. PATENT DOCUMENTS

| | | | |
|---|---|---|---|
| 7,480,611 B2 | 1/2009 | Gooding et al. | |
| 9,507,711 B1 | 11/2016 | Kotte et al. | |
| 10,055,224 B2 | 8/2018 | Aingaran et al. | |
| 10,528,466 B2 | 1/2020 | Lee et al. | |
| 10,565,123 B2 | 2/2020 | Song et al. | |
| 10,713,162 B1 | 7/2020 | Ben-Yehuda et al. | |
| 10,754,768 B2 | 8/2020 | Lee | |
| 10,789,160 B2 | 9/2020 | Seo et al. | |
| 11,269,771 B2 * | 3/2022 | Kim | G06F 12/0804 |
| 2017/0109042 A1 * | 4/2017 | Ke | G06F 12/0871 |
| 2019/0278704 A1 * | 9/2019 | Lee | G06F 3/064 |
| 2019/0303293 A1 * | 10/2019 | Byun | G06F 12/0246 |
| 2019/0310780 A1 * | 10/2019 | Gholamipour | G06F 3/0679 |
| 2020/0065241 A1 * | 2/2020 | Cho | G06F 12/0246 |
| 2020/0125261 A1 * | 4/2020 | Byun | G06F 3/0679 |
| 2020/0319826 A1 * | 10/2020 | Shin | G06F 3/0604 |
| 2021/0026763 A1 * | 1/2021 | Kim | G06F 12/1009 |
| 2021/0405914 A1 * | 12/2021 | Lam | G06F 3/0679 |

* cited by examiner

*Primary Examiner* — Tasnima Matin
(74) *Attorney, Agent, or Firm* — Fish & Richardson P.C.

(57) ABSTRACT

A storage device includes; a non-volatile memory, and a storage controller including a processor, an accelerator and a memory storing a flash translation layer including a mapping table including mapping information between logical page numbers and physical page numbers. The processor may provide a command to the non-volatile memory and provide first mapping update information in a first mapping update size to the accelerator. Upon updating mapping information of the mapping table, the accelerator may update mapping information for logical page numbers and check continuity for the first mapping update information.

19 Claims, 11 Drawing Sheets

SYSTEM AND METHOD FOR MANAGEMENT OF ELECTRONIC MEMORY

CROSS-REFERENCE TO RELATED APPLICATIONS

This application claims priority under 35 U.S.C. 119 to Korean Patent Application No. 10-2021-0154782 filed on Nov. 11, 2021 and Korean Patent Application No. 10-2021-0193333 filed on Dec. 30, 2021, the collective subject matter of which is hereby incorporated by reference in its entirety.

BACKGROUND

1. 1. Technical Field

The inventive concept relates generally to storage devices and operating methods for same.

2. Description of the Related Art

Storage devices and storage system including same may include a mapping table that is used to correlate (or "map") logical memory address(es) used in a host environment to corresponding physical memory address(es) used in a non-volatile memory device environment. That is, a storage controller controlling a non-volatile memory device (e.g., a flash memory device) may convert logical memory addresses into physical memory addresses, and physical addresses into logical memory addresses using the mapping table.

However, during the process of address converting using the mapping table, certain mapping information for logical page number(s) (LPN) and/or physical page number(s) (PPN) may be changed. Should this occur, the mapping table may be redundantly accessed for an entry including already updated mapping information, and thus unnecessary read/write operation(s) may be performed. And as a result, operational performance of a storage device may be degraded.

SUMMARY

Embodiments of the inventive concept provide storage devices exhibiting improved overall operational performance.

Embodiments of the inventive concept also provide methods of operating a storage device that enable improved operational performance.

According to an embodiment of the inventive concept, a storage device may include; a non-volatile memory, and a storage controller including a processor, an accelerator and a memory storing a flash translation layer including a mapping table including mapping information between logical page numbers and physical page numbers, wherein the processor provides a command to the non-volatile memory and provides first mapping update information in a first mapping update size to the accelerator, and upon updating mapping information of the mapping table, the accelerator is configured to update mapping information for logical page numbers and check continuity for the first mapping update information.

According to an embodiment of the inventive concept, a storage device may include; a non-volatile memory, and a storage controller including a processor, an accelerator and a memory storing a flash translation layer including a mapping table including mapping information between logical page numbers and physical page numbers, wherein the processor is configured to provide a command to the non-volatile memory and provide first mapping update information in a first mapping update size to the accelerator, the mapping table includes first to $N^{th}$ mapping table entries indexed by the logical page numbers, the accelerator is configured to read the first to $N^{th}$ mapping table entries, and upon updating the mapping information of the mapping table, the accelerator is further configured to update mapping information corresponding to a first_first logical page number and a first_second logical page number in the first mapping update information included in the first mapping update size, and check continuity of first mapping update information.

According to an embodiment of the inventive concept, a method of operating a storage device may include; communicating first mapping update information included in a first mapping update size to an accelerator using a processor, accessing a mapping table including first to $N^{th}$ mapping table entries using the accelerator, determine whether mapping information of the first to $N^{th}$ mapping table entries included in the mapping table exceeds the first mapping update size using the accelerator, and checking continuity of the first mapping update information by reading the mapping table entries in a reverse order from an $(N-1)^{th}$ mapping table entry when the mapping information of the first to $N^{th}$ mapping table entries exceed the first mapping update size using the accelerator.

BRIEF DESCRIPTION OF THE DRAWINGS

Advantages, benefits, aspects, and features, as well as the making and use of the inventive concept may be understood upon consideration of the following detail description together with the accompanying drawings, in which.

DETAILED DESCRIPTION

Figure 1:
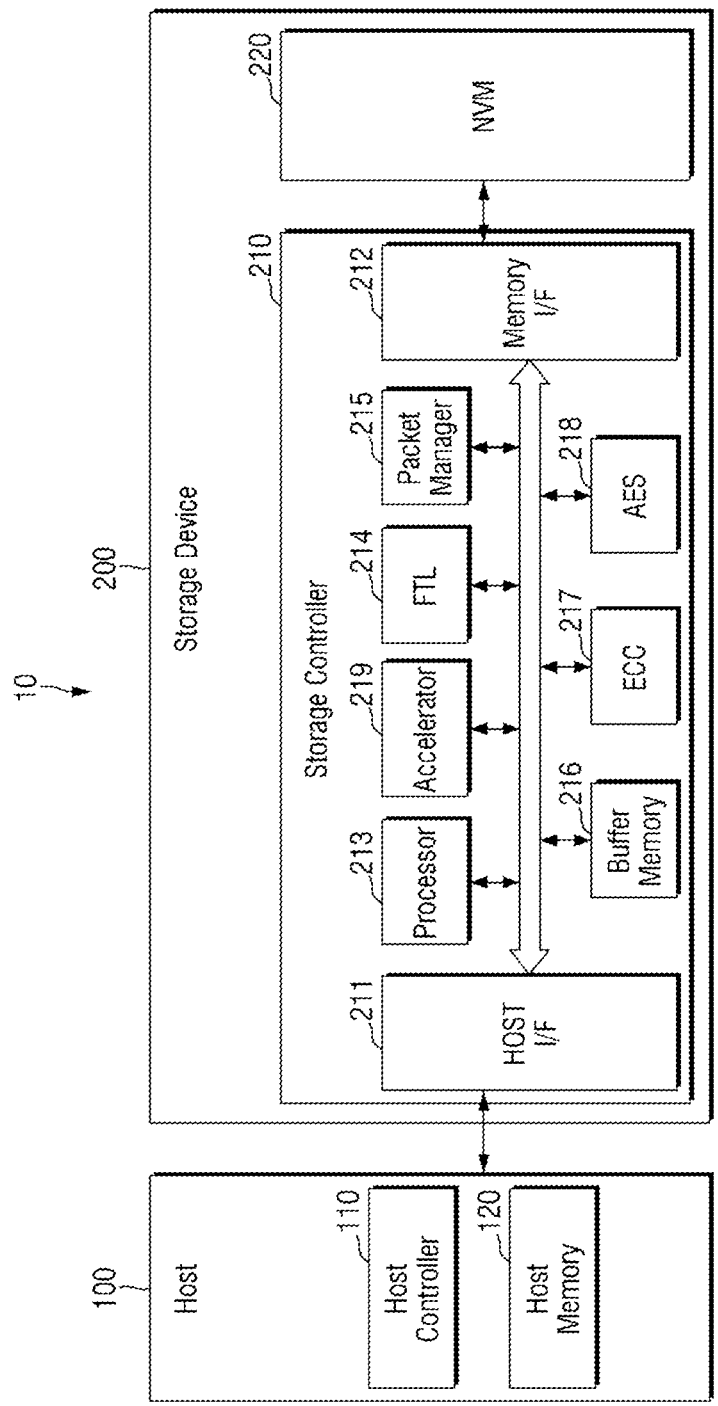
FIG. 1 is a block diagram illustrating a storage system according to embodiments of the inventive concept.

Throughout the written description and drawings, like reference numbers and labels are used to denote like or similar elements, components, features and/or method steps.

Figure (FIG.) 1 is a block diagram illustrating a storage system according to embodiments of the inventive concept.

The storage system 10 may generally include a host device 100 and a storage device 200, wherein the storage device 200 includes a storage controller 210 and a non-volatile memory (NVM) 220. In some embodiments, the host device 100 may include a host controller 110 and a host memory 120. The host memory 120 may serve as a buffer memory configured to temporarily store data communicated (e.g., transmitted and/or received) to/from the storage device 200.

The storage device 200 may include storage media configured to store data in response to one or more request(s) received from the host 100. For example, the storage device 200 may include at least one of a solid state drive (SSD), an embedded memory, and a removable external memory.

When the storage device 200 is an SSD, the storage device 200 may be a device that conforms in its operation to an NVMe standard. When the storage device 200 is an embedded memory or an external memory, the storage device 200 may be a device that conforms in its operation to a universal flash storage (UFS) standard or an embedded multi-media card (eMMC) standard. Each of the host 100 and the storage device 200 may be configured to generate and communicate one or more packet(s) according to one or more standard data communications protocol(s).

When the NVM 220 of the storage device 200 includes a flash memory, the flash memory may include a two-dimensional (2D) NAND memory array or a three-dimensional (3D) (or vertical) NAND (VNAND) memory array. Alternately or additionally, the storage device 200 may include various other types of NVM, such as for example, magnetic random access memory (RAM) (MRAM), spin-transfer torque MRAM, conductive bridging RAM (CBRAM), ferroelectric RAM (FRAM), phase RAM (PRAM), and resistive RAM (RRAM).

In some embodiments, the host controller 110 and the host memory 120 may be embodied as separate semiconductor chips. Alternately, the host controller 110 and the host memory 120 may be integrated into a single semiconductor chip. As an example, the host controller 110 may be any one of a plurality of modules included in an application processor (AP). In some embodiments, the AP may be embodied as a System on Chip (SoC). Further, the host memory 120 may be an embedded memory included in the AP or an NVM or memory module located external to the AP.

The host controller 110 may be used to manage various data access operations (e.g., read operations, write operations and erase operations) performed by the storage device 200 in conjunction with the host memory 120. That is, write data (e.g., data to be programmed to the NVM 220) may be communicated from the host memory 120 to the storage device 200 and read data (e.g., data retrieved from the NVM 220) may be communicated from the storage device 200 to the host memory 120.

The storage controller 210 may include a host interface 211, a memory interface 212, and a processor 213. Further, the storage controller 210 may further include a flash translation layer (FTL) 214, a packet manager 215, a buffer memory 216, an error correction code (ECC) engine 217, and an advanced encryption standard (AES) engine 218.

The storage controller 210 may further include a working memory (not shown) in which the FTL 213 may be loaded. The processor 213 may use the FTL 214 to control write and read operations performed by the NVM 220.

The host interface 211 may communicate packet(s) with the host 100. Packets communicated from the host 100 to the host interface 211 may include a command and/or write data. Packet(s) communicated from the host interface 211 to the host 100 may include read data.

The memory interface 212 may facilitate the communication of data between the storage controller 210 and the NVM 220. Thus, the memory interface 216 may be configured in accordance with one or more standard data communication protocol(s), such as Toggle or open NAND flash interface (ONFI).

The FTL 214 may perform various functions, such as an address mapping operation, a wear-leveling operation, and a garbage collection operation. The address mapping operation may be an operation of converting a logical address received from the host 100 into a physical address used to actually store data in the NVM 220. The wear-leveling operation may implemented an approach inhibiting excessive use of specific block(s) by spreading data access operations more uniformly over memory blocks of the NVM 220. In some embodiments, the wear-leveling operation may be implemented using firmware that balances erase counts over a range of memory blocks. The garbage collection operation may implement an approach ensuring usable data storage capacity of the NVM 220 by copying valid data from an existing block, and then erasing the existing blocks to form a new block.

The packet manager 215 may generate packet(s) according to an interface protocol compatible with the host 100, and/or parse various types of information from packet(s) received from the host 100. In addition, the buffer memory 216 may temporarily store write data to be written to the NVM 220 or read data retrieved from the NVM 220. The buffer memory 216 may be a component included in the storage controller 210, or alternately, the buffer memory 216 may be disposed external to the storage controller 210.

The ECC engine 217 may be used perform error detection and/or correction operations on read data retrieved from the NVM 220. That is, the ECC engine 217 may generate parity bits for write data to be written to the NVM 220, and the generated parity bits may be stored in the NVM 220 along with write data. During a subsequent read operation, the ECC engine 217 may detect and/or correct error(s) in the read data using the parity bits read from the NVM 220 along with the read data in order to provide error-corrected read data.

The AES engine 218 may perform at least one of an encryption operation and a decryption operation on data input to the storage controller 210 using a symmetric-key algorithm.

An accelerator 219 may be used to change mapping information of a mapping table 214a of logical page numbers (LPNs) and physical page numbers (PPNs) between the processor 213 and the FTL 214, as well as change continuity information of the mapping information.

In some embodiments, the accelerator 219 may be embodied in hardware and included in the storage controller 210. However, embodiments are not limited thereto, and the accelerator 219 may alternately be embodied in software executed by the processor 213.

Operation of the accelerator 219 will be described hereafter in some additional detail.

Figure 2:
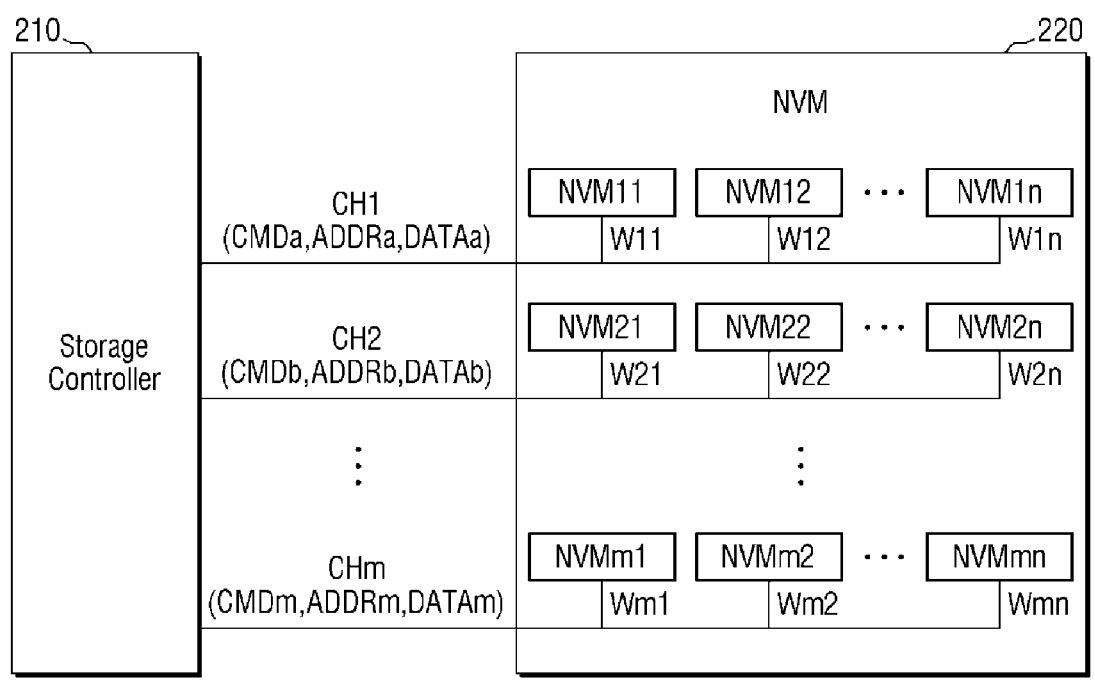
FIG. 2 is a block diagram further illustrating the storage controller and the non-volatile memory (NVM) of FIG. 1.

FIG. 2 is a block diagram further illustrating in one embodiment the storage device 200 of FIG. 1.

Referring to FIG. 2, the storage device 200 may include the NVM 220 and the storage controller 210. The storage device 200 may support a plurality of channels CH1 to CHm, and the NVM 220 and the storage controller 210 may be connected through the plurality of channels CH1 to CHm.

For example, the storage device 200 may be embodied as a storage device, such as an SSD.

The NVM 220 may include a plurality of NVM devices NVM11 to NVMmn. Each of the NVM devices NVM11 to NVMmn may be connected to one of the plurality of channels CH1 to CHm through a way corresponding thereto. For example, the NVM devices NVM11 to NVM1$n$ may be connected to a first channel CH1 through ways W11 to W1$n$, and the NVM devices NVM21 to NVM2$n$ may be connected to a second channel CH2 through ways W21 to W2$n$. In some embodiments, each of the NVM devices NVM11 to NVMmn may be embodied as an arbitrary memory unit that may operate according to an individual command from the storage controller 210. For example, each of the NVM devices NVM11 to NVMmn may be embodied as a chip or a die, but the inventive concept is not limited thereto.

The storage controller 210 may communicate signals to/from the NVM 220 through the plurality of channels CH1 to CHm. For example, the storage controller 210 may communicate commands CMDa to CMDm, addresses ADDRa to ADDRm, and data DATAa to DATAm to the NVM 220 through the channels CH1 to CHm or communicate the data DATAa to DATAm from the NVM 220.

The storage controller 210 may select one of the NVM devices, which is connected to each of the channels CH1 to CHm, using a corresponding one of the channels CH1 to CHm, and communicate signals to/from the selected NVM device. For example, the storage controller 210 may select the NVM device NVM11 from the NVM devices NVM11 to NVM1$n$ connected to the first channel CH1. The storage controller 210 may communicate the command CMDa, the address ADDRa, and the data DATAa to the selected NVM device NVM11 through the first channel CH1 or communicate the data DATAa from the selected NVM device NVM11.

The storage controller 210 may communicate signals to/from the NVM 220 in parallel through different channels. For example, the storage controller 210 may communicate a command CMDb to the NVM 220 through the second channel CH2 while communicating a command CMDa to the NVM 220 through the first channel CH1. For example, the storage controller 210 may communicate data DATAb from the NVM 220 through the second channel CH2 while receiving data DATAa from the NVM 220 through the first channel CH1.

The storage controller 210 may control overall operation of the NVM 220. The storage controller 210 may communicate a signal to the channels CH1 to CHm and control each of the NVM devices NVM11 to NVMmn connected to the channels CH1 to CHm. For example, the storage controller 210 may communicate the command CMDa and the address ADDRa to the first channel CH1 and control one selected from the NVM devices NVM11 to NVM1$n$.

Each of the NVM devices NVM11 to NVMmn may operate under the control of the storage controller 210. For example, the NVM device NVM11 may program the data DATAa based on the command CMDa, the address ADDRa, and the data DATAa provided to the first channel CH1. For example, the NVM device NVM21 may read the data DATAb based on the command CMDb and the address ADDb provided to the second channel CH2 and communicate the read data DATAb to the storage controller 210.

Although FIG. 2 assumes an example in which the NVM 220 communicates with the storage controller 210 through 'm' channels and includes 'n' NVM devices corresponding to each of the channels, the number of channels and the number of NVM devices connected to one channel may vary by design.

Figure 3:
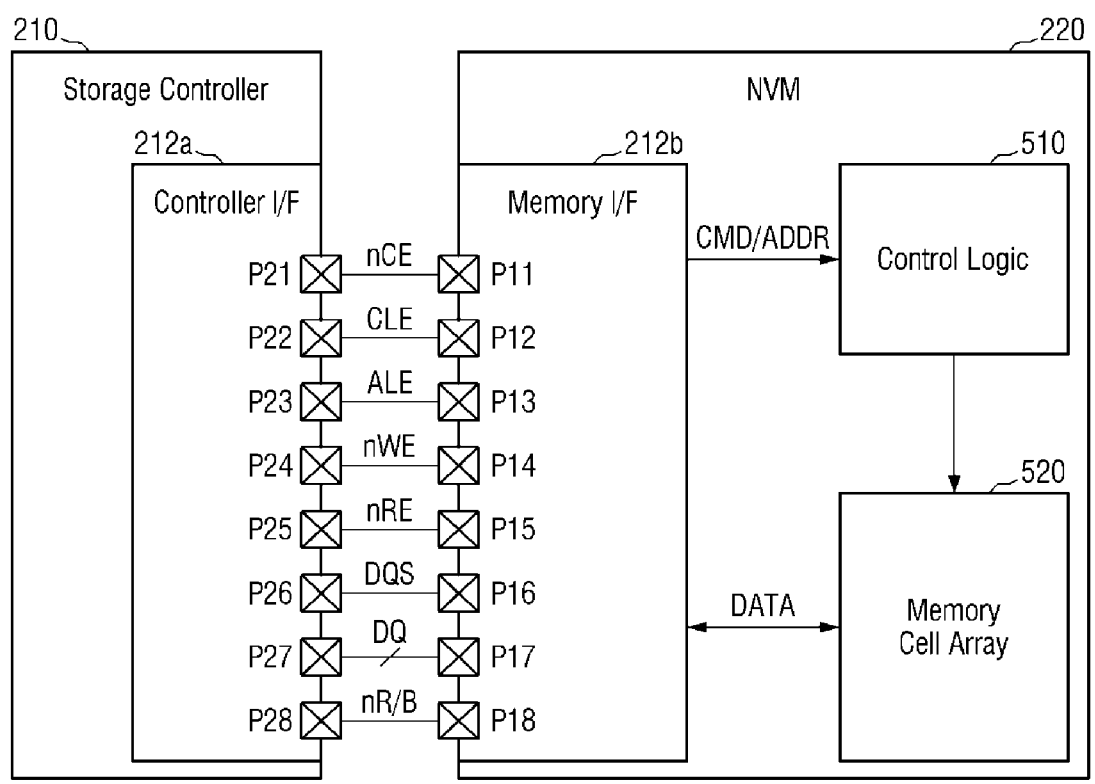
FIG. 3 is a block diagram illustrating the storage controller, the memory interface, and the NVM of FIG. 1.

FIG. 3 is a block diagram further illustrating in one example the storage controller 210 and NVM 220 of FIG. 1. In some embodiments, the memory interface 212 of FIG. 1 may include a controller interface circuit 212$a$ like the one shown in FIG. 3.

The NVM 220 may include, for example, first to eight pins P11 to P18, a memory interface circuitry 212$b$, a control logic circuitry 510, and a memory cell array 520.

The memory interface circuitry 212$b$ may communicate a chip enable signal nCE from the storage controller 210 through the first pin P11. The memory interface circuitry 212$b$ may communicate signals to/from the storage controller 210 through the second to eighth pins P12 to P18 in accordance with a state of the chip enable signal nCE. For example, when the chip enable signal nCE is in an enable state (e.g., a low level), the memory interface circuitry 212$b$ may communicate signals to/from the storage controller 210 through the second to eighth pins P12 to P18.

The memory interface circuitry 212$b$ may communicate a command latch enable signal CLE, an address latch enable signal ALE, and a write enable signal nWE from the storage controller 210 through the second to fourth pins P12 to P14. The memory interface circuitry 212$b$ may communicate a data signal DQ from the storage controller 210 through the seventh pin P17 or communicate the data signal DQ to the storage controller 210. A command CMD, an address ADDR, and data DATA may be communicated via the data signal DQ. For example, the data signal DQ may be communicated through a plurality of data signal lines. In this case, the seventh pin P17 may include a plurality of pins respectively corresponding to a plurality of data signals DQ(s). In this case, the seventh pin P17 may include a plurality of pins respectively corresponding to a plurality of data signals.

The memory interface circuitry 212$b$ may receive the command CMD from the data signal DQ, which is communicated in an enable section (e.g., a high-level state) of the command latch enable signal CLE based on toggle time points of the write enable signal nWE. The memory interface circuitry 212$b$ may receive the address ADDR from the data signal DQ, which is communicated in an enable section (e.g., a high-level state) of the address latch enable signal ALE based on the toggle time points of the write enable signal nWE.

In some embodiments, the write enable signal nWE may be maintained at a static state (e.g., a high level or a low level) and toggle between the high level and the low level. For example, the write enable signal nWE may toggle in a section in which the command CMD or the address ADDR is communicated. Thus, the memory interface circuitry 212$b$ may receive the command CMD or the address ADDR based on toggle time points of the write enable signal nWE.

The memory interface circuitry 212$b$ may communicate a read enable signal nRE from the storage controller 210 through the fifth pin P15. The memory interface circuitry 212$b$ may communicate a data strobe signal DQS from the storage controller 210 through the sixth pin P16 or communicate the data strobe signal DQS to the storage controller 210.

During a read operation preformed by the NVM 220, the memory interface circuitry 212$b$ may communicate the read enable signal nRE, which toggles through the fifth pin P15, before outputting the data DATA. The memory interface circuitry 212$b$ may generate the data strobe signal DQS, which toggles based on the toggling of the read enable signal nRE. For example, the memory interface circuitry 212b may generate a data strobe signal DQS, which starts toggling after a predetermined delay (e.g., tDQSRE), based on a toggling start time of the read enable signal nRE. The memory interface circuitry 212b may communicate the data signal DQ including the data DATA based on a toggle time point of the data strobe signal DQS. Thus, the data DATA may be aligned with the toggle time point of the data strobe signal DQS and communicated to the storage controller 210.

During a write operation performed by the NVM 220, when the data signal DQ including the data DATA is communicated from the storage controller 210, the memory interface circuitry 212b may communicate the data strobe signal DQS, which toggles, along with the data DATA from the storage controller 210. The memory interface circuitry 212b may receive the data DATA from the data signal DQ based on a toggle time point of the data strobe signal DQS. For example, the memory interface circuitry 212b may sample the data signal DQ at rising/falling edges of the data strobe signal DQS in order to receive the data DATA.

The memory interface circuitry 212b may communicate a ready/busy output signal nR/B to the storage controller 210 through the eighth pin P18. The memory interface circuitry 212b may communicate state information of the NVM 220 through the ready/busy output signal nR/B to the storage controller 210. When the NVM 220 is in a busy state (e.g., when operation(s) are being performed by the NVM 220), the memory interface circuitry 212b may communicate a ready/busy output signal nR/B indicating the busy state to the storage controller 210. When the NVM 220 is in a ready state (e.g., when an operation is not performed by the NVM 220), the memory interface circuitry 212b may communicate a ready/busy output signal nR/B indicating the ready state to the storage controller 210.

For example, while the NVM 220 is reading data DATA from the memory cell array 520 in response to a page read command, the memory interface circuitry 212b may communicate a ready/busy output signal nR/B indicating a busy state (e.g., a low level) to the storage controller 210. Alternately, while the NVM 220 is programming data DATA to the memory cell array 520 in response to a program command, the memory interface circuitry 212b may communicate a ready/busy output signal nR/B indicating the busy state to the storage controller 210.

The control logic circuitry 510 may control overall operations of the NVM 220. The control logic circuitry 510 may communicate the command/address CMD/ADDR received from the memory interface circuitry 212b. The control logic circuitry 510 may generate control signals for controlling other components of the NVM 220 in response to the communicated command/address CMD/ADDR. For example, the control logic circuitry 510 may generate various control signals for programming data DATA to the memory cell array 520 or reading the data DATA from the memory cell array 520.

The memory cell array 520 may store the data DATA received from the memory interface circuitry 212b under the control of the control logic circuitry 510. The memory cell array 520 may output the stored data DATA to the memory interface circuitry 212b under the control of the control logic circuitry 510.

The memory cell array 520 may include a plurality of memory cells. For example, the plurality of memory cells may include at least one of flash memory cells, RRAM cells, FRAM cells, PRAM cells, TRAM cells, and MRAM cells. Hereinafter, the illustrated embodiments assume the use of NAND flash memory cells.

The storage controller 210 may include first to eighth pins P21 to P28 and a controller interface circuitry 212a. The first to eighth pins P21 to P28 may respectively correspond to the first to eighth pins P11 to P18 of the NVM 220.

The controller interface circuitry 212a may communicate a chip enable signal nCE to the NVM 220 through the first pin P21. The controller interface circuitry 212a may communicate signals to/from the NVM 220, as selected by the chip enable signal nCE, through the second to eighth pins P22 to P28.

The controller interface circuitry 212a may communicate the command latch enable signal CLE, the address latch enable signal ALE, and the write enable signal nWE to the NVM 220 through the second to fourth pins P22 to P24. The controller interface circuitry 212a may communicate the data signal DQ to/from the NVM 220 through the seventh pin P27.

The controller interface circuitry 212a may communicate the data signal DQ including the command CMD or the address ADDR to the NVM 220 along with the write enable signal nWE which toggles. The controller interface circuitry 212a may communicate the data signal DQ including the command CMD to the NVM 220 by communicating a command latch enable signal CLE having an enable state. The controller interface circuitry 212a may communicate the data signal DQ including the address ADDR to the NVM 220 by communicating an address latch enable signal ALE having an enable state.

The controller interface circuitry 212a may communicate the read enable signal nRE to the NVM 220 through the fifth pin P25. The controller interface circuitry 212a may communicate the data strobe signal DQS from or to the NVM 220 through the sixth pin P26.

During a read operation performed by the NVM 220, the controller interface circuitry 212a may generate a read enable signal nRE, which toggles, and communicates the read enable signal nRE to the NVM 220. For example, before outputting read data, the controller interface circuitry 212a may generate a read enable signal nRE, which is changed from a static state (e.g., a high level or a low level) to a toggling state. Thus, the NVM 220 may generate a data strobe signal DQS, which toggles, based on the read enable signal nRE. The controller interface circuitry 212a may receive the data signal DQ including the data DATA along with the data strobe signal DQS, which toggles, from the NVM 220. The controller interface circuitry 212a may receive the data DATA from the data signal DQ based on a toggle time point of the data strobe signal DQS.

During a write operation performed by the NVM 220, the controller interface circuitry 212a may generate a data strobe signal DQS, which toggles. For example, before communicating write data, the controller interface circuitry 212a may generate a data strobe signal DQS, which is changed from a static state (e.g., a high level or a low level) to a toggling state. The controller interface circuitry 212a may communicate the data signal DQ including the data DATA to the NVM 220 based on toggle time points of the data strobe signal DQS.

The controller interface circuitry 212a may receive a ready/busy output signal nR/B from the NVM 220 through the eighth pin P28. The controller interface circuitry 212a may determine state information of the NVM 220 based on the ready/busy output signal nR/B.

Figure 4:
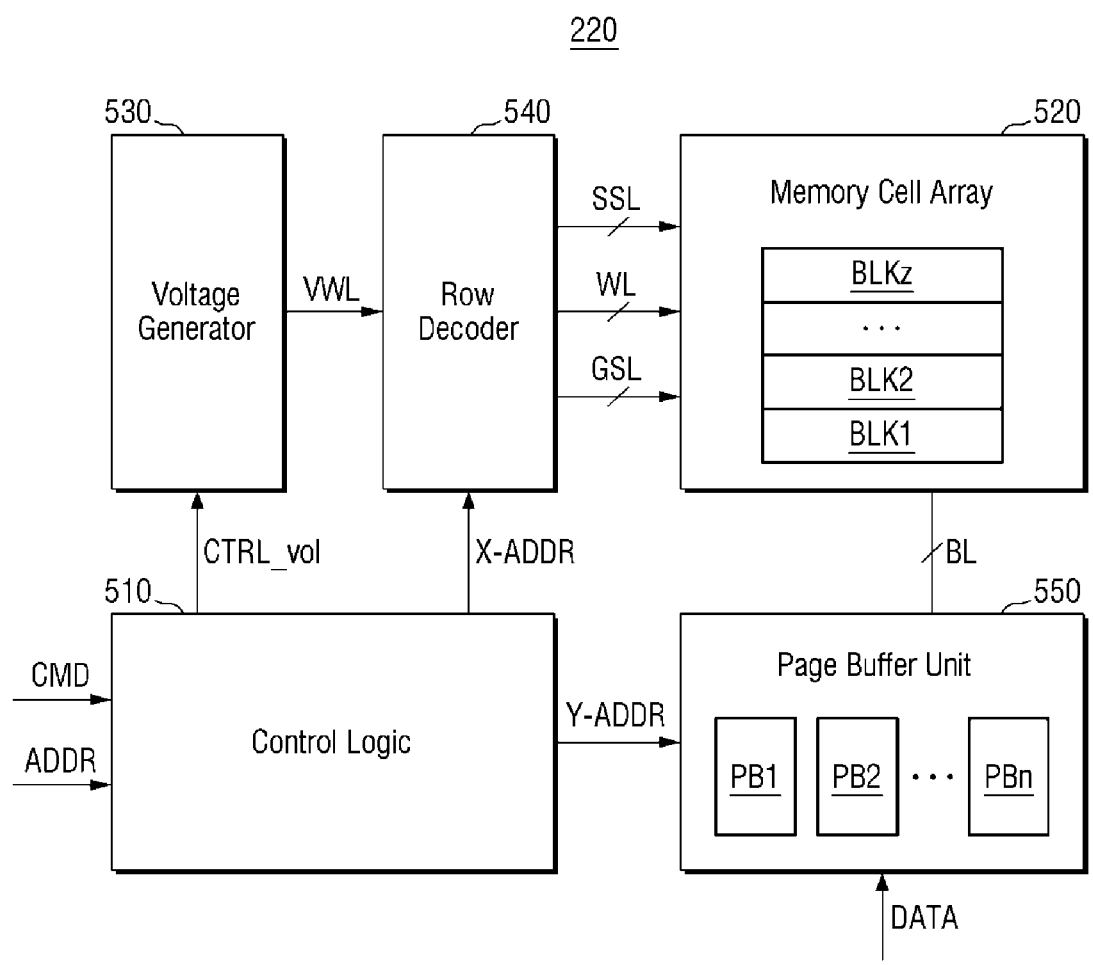
FIG. 4 is a block diagram further illustrating the NVM of FIG. 3.

FIG. 4 is a block diagram further illustrating in one embodiment the NVM 220 of FIG. 3.

Referring to FIG. 4, the NVM 220 may include a control logic circuitry 510, a memory cell array 520, a page buffer unit 550, a voltage generator 530, and a row decoder 540. Although not shown in FIG. 4, the NVM 220 may further include a memory interface circuitry 212b shown in FIG. 3. In addition, the NVM 220 may further include a column logic, a pre-decoder, a temperature sensor, a command decoder, an address decoder, etc.

The control logic circuitry 510 may control all various operations performed by the NVM 220. The control logic circuitry 510 may output various control signals in response to commands CMD and/or addresses ADDR received from the memory interface circuitry 212b of FIG. 3. For example, the control logic circuitry 510 may output a voltage control signal CTRL_vol, a row address X-ADDR, and a column address Y-ADDR.

The memory cell array 520 may include a plurality of memory blocks BLK1 to BLKz, wherein 'z' is a positive integer, each of which may include a plurality of memory cells. The memory cell array 520 may be connected to the page buffer unit 550 through bit lines BL and be connected to the row decoder 540 through word lines WL, string selection lines SSL, and ground selection lines GSL.

In some embodiments, the memory cell array 520 may include a 3D memory cell array, which includes a plurality of NAND strings. Each of the NAND strings may include memory cells respectively connected to word lines vertically stacked on a substrate. In some embodiments, the memory cell array 520 may include a 2D memory cell array, which includes a plurality of NAND strings arranged in a row direction and a column direction.

The page buffer unit 550 may include a plurality of page buffers PB1 to PBn, wherein 'n' is an integer greater than 2, which may be respectively connected to the memory cells through a plurality of bit lines BL. The page buffer unit 550 may select at least one of the bit lines BL in response to the column address Y-ADDR. The page buffer unit 340 may operate as a write driver or a sense amplifier according to an operation mode. For example, during a write (or program) operation, the page buffer unit 550 may apply a bit line voltage corresponding to data to be programmed, to the selected bit line. During a read operation, the page buffer unit 550 may sense current or a voltage of the selected bit line BL and sense data stored in the memory cell.

The voltage generator 530 may generate various kinds of voltages for program, read, and erase operations based on the voltage control signal CTRL_vol. For example, the voltage generator 530 may generate a program voltage, a read voltage, a program verification voltage, and an erase voltage as a word line voltage VWL.

The row decoder 540 may select one of a plurality of word lines WL and select one of a plurality of string selection lines SSL in response to the row address X-ADDR. For example, the row decoder 540 may apply the program voltage and the program verification voltage to the selected word line WL during a program operation and apply the read voltage to the selected word line WL during a read operation.

Figure 5:
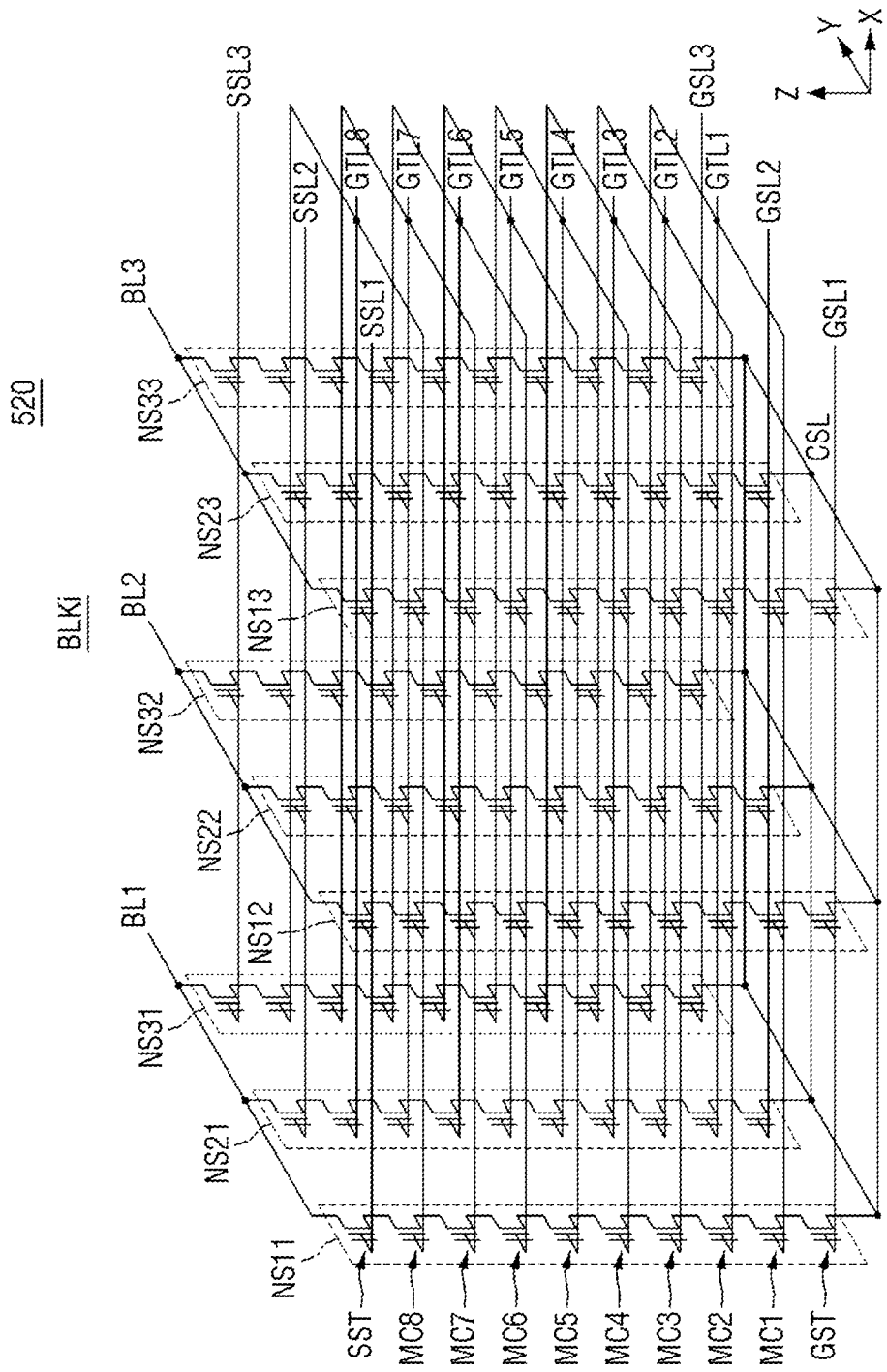
FIG. 5 is a partial circuit diagram illustrating a three-dimensional (3D) vertical NAND (VNAND) structure applicable to a NVM according to embodiments of the inventive concept.

FIG. 5 is a partial circuit diagram illustrating a 3D V-NAND structure applicable to a block of the memory cell array 520 of FIG. 4. That is, assuming that the NVM 220 of the storage device 200 of FIG. 1 is implemented as a 3D V-NAND flash memory, each of a plurality of memory blocks included in the NVM 220 may be configured according to the circuit diagram of FIG. 5.

A memory block BLKi shown in FIG. 5 may refer to a 3D memory block having a 3D structure formed on a substrate. For example, a plurality of memory NAND strings included in the memory block BLKi may be formed in a vertical direction to the substrate.

Referring to FIG. 5, the memory block BLKi may include a plurality of memory NAND strings NS11 to NS33, which are connected between bit lines BL1, BL2, and BL3 and a common source line CSL. Each of the memory NAND strings NS11 to NS33 may include a string selection transistor SST, a plurality of memory cells e.g., MC1, MC2, . . . , and MC8, and a ground selection transistor GST. Each of the memory NAND strings NS11 to NS33 is illustrated as including eight memory cells MC1, MC2, . . . , and MC8 in FIG. 5, without being limited thereto.

The string selection transistor SST may be connected to string selection lines SSL1, SSL2, and SSL3 corresponding thereto. Each of the memory cells MC1, MC2, . . . , and MC8 may be connected to a corresponding one of gate lines GTL1, GTL2, . . . , and GTL8. The gate lines GTL1, GTL2, . . . , and GTL8 may respectively correspond to word lines, and some of the gate lines GTL1, GTL2, . . . , and GTL8 may correspond to dummy word lines. The ground selection transistor GST may be connected to ground selection lines GSL1, GSL2, and GSL3 corresponding thereto. The string selection transistor SST may be connected to the bit lines BL1, BL2, and BL3 corresponding thereto, and the ground selection transistor GST may be connected to the common source line CSL.

Word lines (e.g., WL1) at the same level may be connected in common, and the ground selection lines GSL1, GSL2, and GSL3 and the string selection lines SSL1, SSL2, and SSL3 may be separated from each other. FIG. 5 illustrates an example in which a memory block BLK is connected to eight gate lines GTL1, GTL2, . . . , and GTL8 and three bit lines BL1, BL2, and BL3, without being limited thereto.

Figure 6:
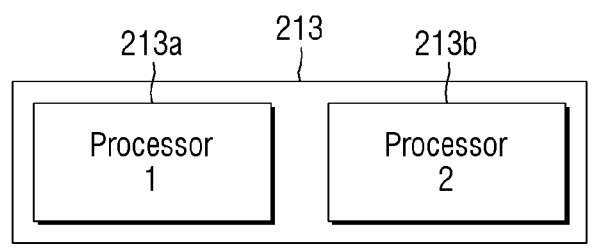
FIG. 6 is a block diagram further illustrating the processor of FIG. 1.

FIG. 6 is a block diagram further illustrating in one example the processor 213 of FIG. 1.

Referring to FIGS. 1 and 6, the processor 213 may include a first processor 213a and a second processor 231b.

When a write command is received from the host device 100, the first processor 213a may request the host device 100 to transmit write data and may receive the write data consistent with the requested write operation. In addition, the first processor 213a may store the write data received from the host device 100 in the buffer memory 216. In some embodiments, the first processor 213a may include a host core, but the embodiments are not limited thereto.

The second processor 213b may than program the write data stored in the buffer memory 216 to the NVM 220 in order to execute the write command received from the host device 100. In some embodiments, the second processor 23b may include a flash core, but the embodiments are not limited thereto.

Figure 7:
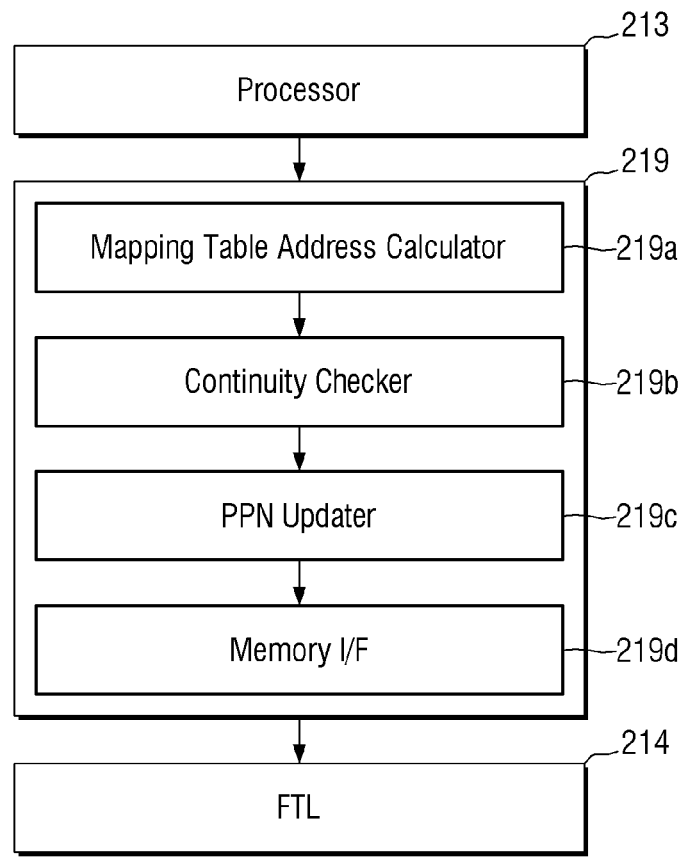
FIG. 7 is a block diagram further illustrating the accelerator of FIG. 1.
Figure 8:
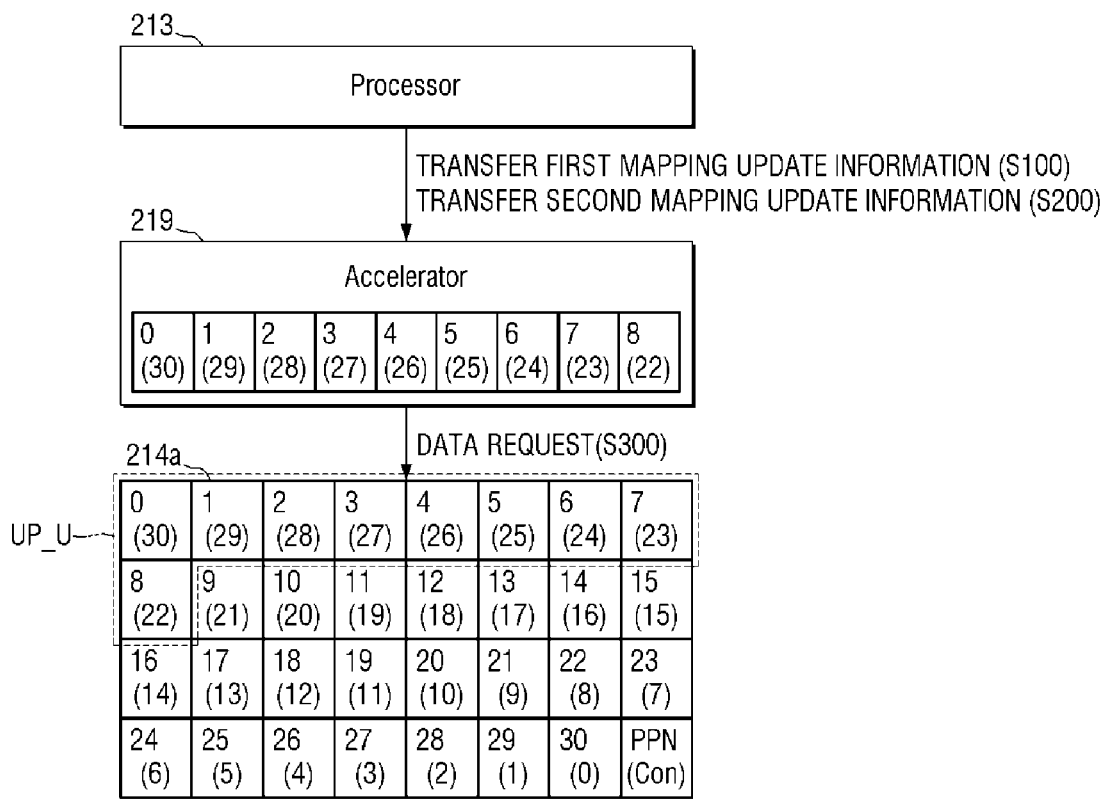
FIGS. 8 and 9 are respective conceptual diagrams illustrating operation of a storage device according to embodiments of the inventive concept.
Figure 9:
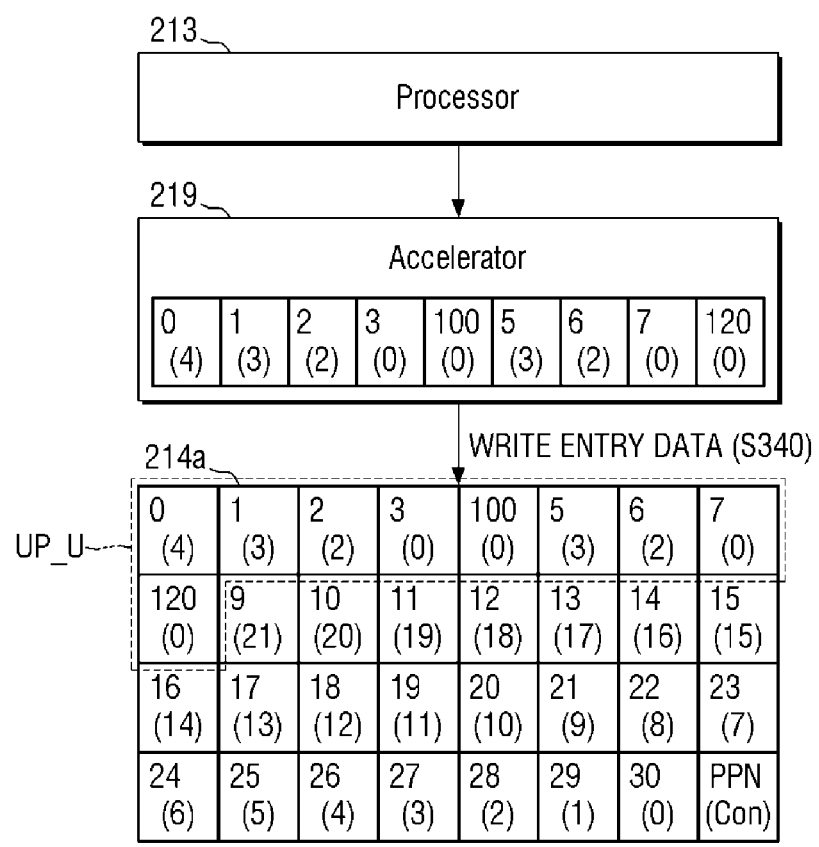
Figure 10:
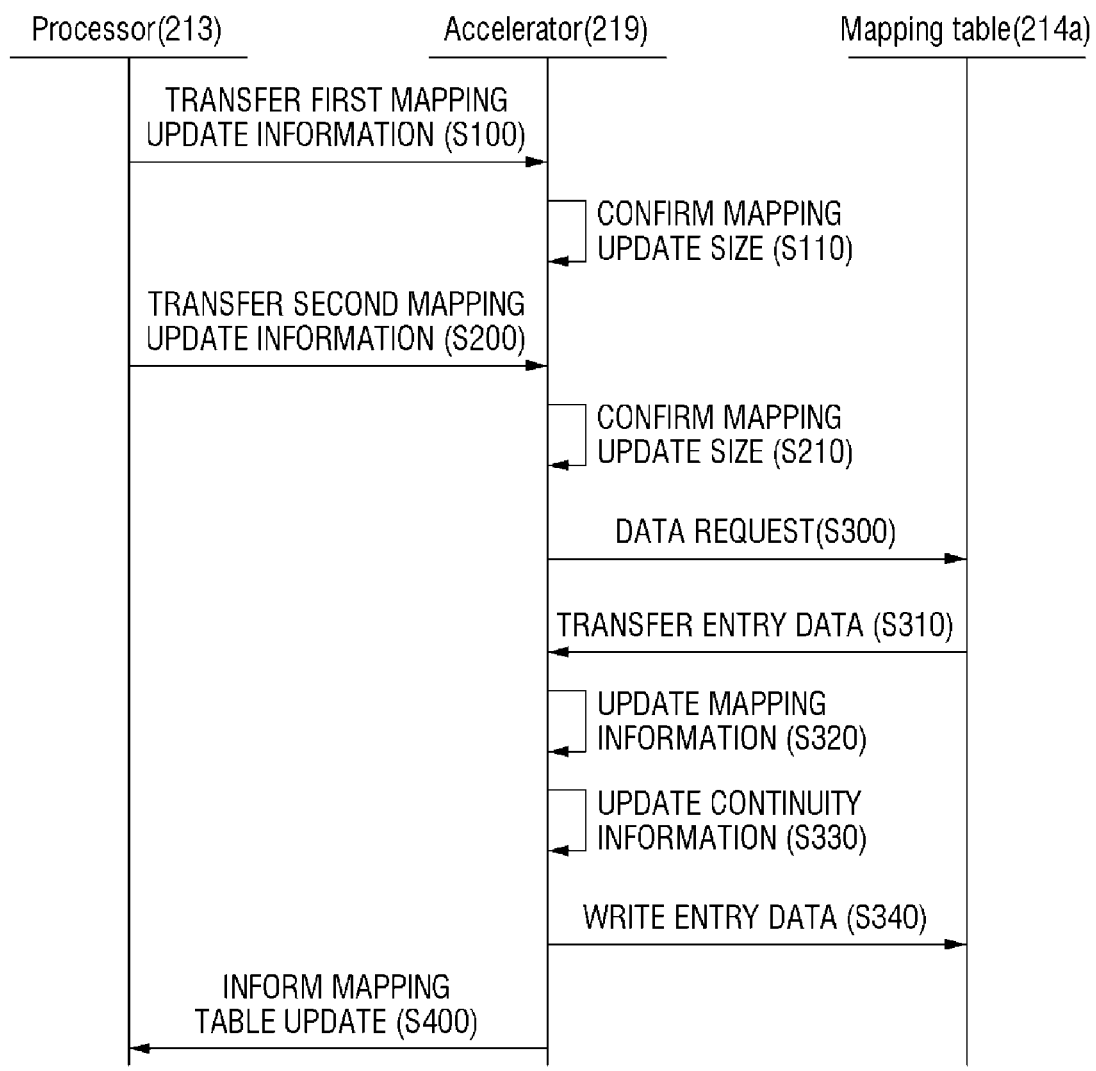
FIG. 10 is a flow diagram illustrating operation of a storage device according to embodiments of the inventive concept.

FIG. 7 is a block diagram further illustrating in one embodiment the accelerator 219 of FIG. 1; FIGS. 8 and 9 are respective conceptual diagrams further illustrating operation of the storage device 200 according to embodiments of the inventive concept, and FIG. 10 is a flow diagram further illustrating operation of the storage device 200 according to embodiments of the inventive concept.

Referring to FIGS. 1 and 7, the accelerator 219 may include a mapping table address calculator 219a, a continuity checker 219b, a physical page number (PPN) updater 219c, and a memory interface 219d. Operation of, and interoperation between the mapping table address calculator 219a, the continuity checker 219b, the PPN updater 219c, and the memory interface 219d will be in some additional detail hereafter. For example, change of continuity information and change of mapping information may be simultaneously performed. Accordingly, an order of operation for the foregoing components of the accelerator 219 may be understood in relation to FIGS. 7, 8, 9, and 10.

Referring to FIGS. 1, 7, and 8, the accelerator 219 may receive first mapping update information included a first unit size of mapping update (hereinafter, a "first mapping update size") UP_U from the processor 213. In this regard, a unit size of mapping update may be referred to as a "chunk." For example, the first mapping update size UP_U may include nine (9) entries of a mapping table 214a. However, the inventive concepts are not limited thereto, and the mapping update size may include any reasonable number of entries.

When mapping information of the mapping table 214a of LPNs and PPNs is changed, the accelerator 219 may update mapping information corresponding to a plurality of LPNs and check continuity of the first mapping update information.

The processor 213 may freely "set" (e.g., define) the first mapping update size UP_U. Further, the processor 213 may set a second mapping update size to be different than that of the first mapping update size UP_U, and communicate the second mapping update information to the accelerator 219 in the second mapping update size. The accelerator 219 may update mapping information that corresponds to a plurality of LPNs in the second mapping update information and check continuity of the second mapping update information.

The accelerator 219 may receive mapping update information of PPNs that correspond to the LPNs from the processor 213. Although not shown in FIG. 7, the accelerator 219 may receive the mapping update information communicated through an interface connected to the processor 213.

The mapping table 214a may include first to $N^{th}$ mapping table entries indexed by first to $N^{th}$ LPNs and read by the accelerator 219. First to $N^{th}$ mapping information 0, 1, 2, . . . , 30 of first to $N^{th}$ PPNs, which are values of the mapping table 214a corresponding to the first to $N^{th}$ LPNs, may be mapped to the first to $N^{th}$ mapping table entries, respectively.

Also, the first to $N^{th}$ mapping table entries may include continuity information 'Con' (e.g., a number indicated in the parentheses of FIG. 8) of the first to $N^{th}$ mapping information 0, 1, 2, . . . , 30, respectively. Although FIG. 8 assumes 31 entries of mapping information for PPNs corresponding to LPNs, this is merely an illustrative example.

In this case, the updated mapping information may correspond to a plurality of LPNs and may be included in a plurality of mapping table entries read by the accelerator 219.

Referring to FIGS. 1 and 8, the first mapping update size UP_U may include mapping update information 4 for a PPN corresponding to the fourth LPN, and mapping update information 8 for a PPN corresponding to the eighth LPN. The mapping update information 4 and 8 may be included in the fifth mapping table entry and the ninth mapping table entry, respectively.

Referring to FIG. 8, the processor 213 may communicate information regarding the mapping update information 4 and 8 to the accelerator 219 (e.g., method steps S100 and S200). Thus, the accelerator 219 may receive information on the mapping update information 4 and 8 from the processor 213.

For example, when a changed PPN corresponding to the fourth LPN is 100 and a changed PPN corresponding to the eighth LPN is 120, the accelerator 219 may receive information on the changed PPNs respectively corresponding to the fourth and eighth LPNs and information on addresses of the mapping table 214a.

The accelerator 219 may access the mapping table 214a including the first to $N^{th}$ mapping table entries. That is, the mapping table address calculator 219a of FIG. 7 may use the mapping update information received from the processor 213 to calculate an address of the mapping table 214a to be accessed.

The accelerator 219 may access the mapping table 214a, issue a data request regarding the mapping information of the first to $N^{th}$ mapping table entries (method step S300), and receive data regarding the mapping information of the first to $N^{th}$ mapping table entries.

Referring to FIG. 8, the accelerator 219 may access the mapping table 214a and issue a data request regarding the first to ninth mapping table entries (S300).

The accelerator 219 may determine whether the first to $N^{th}$ mapping table entries included in the mapping table 214a exceed the first mapping update size UP_U.

When the $N^{th}$ mapping table entry exceeds the first mapping update size UP_U, the accelerator 219 may update the mapping information corresponding to a plurality of LPNs, and change continuity information of the first mapping update information by reading the mapping table entries in reverse order from the $(N-1)^{th}$ mapping table entry. That is, the continuity checker 219b of FIG. 7 may check continuity of the LPN of the updated mapping information and the PPN updater 219c may update the mapping information from a previous PPN to the changed PPN.

Referring to FIGS. 1 and 9, the tenth mapping table entry exceeds the first mapping update size UP_U, the accelerator 219 may update the mapping information 4 and 8 corresponding to the fourth LPN and the eight LPN. That is, the accelerator 219 may update the mapping information to 100, which is the changed PPN corresponding to the fourth LPN, and to 120, which is the changed PPN corresponding to the eighth LPN.

In addition, the accelerator 219 may change continuity information 'Con' of the mapping information included in the first mapping update size UP_U by reading the mapping table entries in reverse order from the ninth mapping table entry that is the last mapping table entry of the first mapping update size UP_U.

In this case, the continuity check may be performed simultaneously with the mapping information update. In addition, the accelerator 219 may perform the continuity check for the mapping information of the fifth mapping table entry and the continuity check for the mapping information of the ninth mapping table entry within the first mapping update size UP_U. In addition, the accelerator 219 may check continuity of the mapping information of the fifth mapping table entry and continuity of the mapping information of the ninth mapping table entry within the first mapping update size UP_U.

According to some embodiments, the processor 219 may set the mapping update size to various sizes, so that more mapping update information can be included in one unit of mapping update. Accordingly, it is possible to minimize redundant access to the mapping table for the entry including the updated mapping information and to reduce the number of the continuity checks for the updated mapping information. As a result, the number of occurrences of an unnecessary write operation on the NVM may be reduced.

The storage device 200 may receive a random logical address, along with a write command, from the host 100. In this case, the random logical information in accordance with the write command may not have a sequential value. In some embodiments, not only when a write operation is performed based on a sequential logical address, but also even when a write operation is performed based on a random logical address, redundant access to the mapping table for the entry including updated mapping information can be minimized. As a result, the number of occurrences of an unnecessary write operation on the NVM may be reduced.

Referring to FIG. 9, the first to ninth mapping table entries of the mapping table 214a, which are changed by the first mapping update information, may be written (method step S340). That is, the memory interface 219d of FIG. 7 may access the mapping table 214a of the FTL 214. Operations of reading, modifying, or writing information of the mapping table 214a may be performed by the memory interface 219d. Then, the accelerator 219 may communicate the changed information of the mapping table 214a to the processor 213.

Referring to FIGS. 1 and 10, the processor 213 may communicate information regarding first mapping update information 4 corresponding to, for example, the fourth LPN to the accelerator 219 (S100). In this case, the accelerator 219 may check a mapping update size UP_U and confirm whether the updated mapping information exceeds a preset mapping update size UP_U (S110).

The processor 213 may communicate information regarding second mapping update information 8 corresponding to, for example, the eighth LPN to the accelerator 219 (S200). In this case, the accelerator 219 may check a mapping update size UP_U and confirm whether the updated mapping information exceeds the preset mapping update size UP_U (S210).

The accelerator 219 may access a mapping table 214a and issue a data request regarding mapping information of, for example, the first to ninth mapping table entries (S300).

The accelerator 219 may receive data regarding the mapping information of, for example, the first to ninth mapping table entries from the mapping table 214a (S310).

For example, when the tenth mapping table entry exceeds the preset mapping update size UP_P, the accelerator 219 may update mapping information corresponding to a plurality of LPNs (S320). In addition, the accelerator 219 may update continuity information 'Con' of the mapping information included in the mapping update size UP_U by reading the mapping table entries in reverse order from the ninth mapping table entry that is the last mapping table entry of the mapping update size UP_U (S330).

The updated mapping information of the first to ninth mapping table entries according to the first mapping update information may be written to the mapping table 214a from the accelerator 219 (S340).

Thereafter, the accelerator 219 may communicate the updated information of the mapping table 214a to the processor 213 and inform of the completion of the update (S400).

Figure 11:
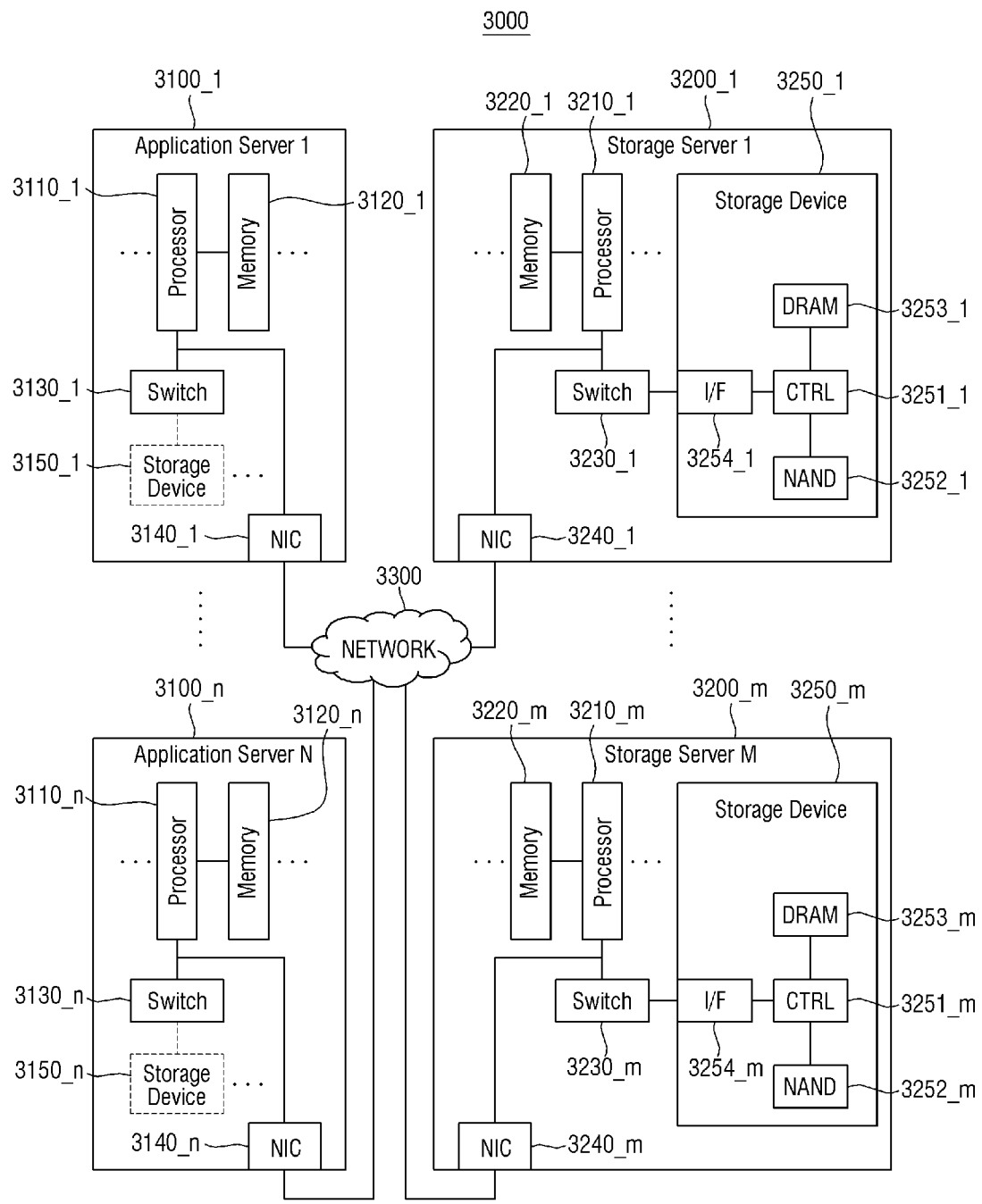
FIG. 11 is a block diagram illustrating a data center that may include a storage device according to embodiments of the inventive concept.

FIG. 11 is a block diagram 3000 illustrating a data center that may incorporate a storage device according to embodiments of the inventive concept.

Referring to FIG. 11, the data center 3000 may be a facility that collects various types of data and provides various services, and may be referred to as a data storage center. The data center 3000 may be a system for operating search engines and databases and may be a computing system used by companies, such as banks or government agencies. The data center 3000 may include application servers 3100 to 3100n and storage servers 3200 to 3200m. The number of the application servers 3100 to 3100n and the number of the storage servers 3200 to 3200m may be variously selected according to embodiments. The number of the application servers 3100 to 3100n and the number of the storage servers 3200 to 3200m may be different from each other.

The application server 3100 may include at least one processor 3110 and at least one memory 3120, and the storage server 3200 may include at least one processor 3210 and at least one memory 3220. An operation of the storage server 3200 will be described as an example. The processor 3210 may control overall operations of the storage server 3200, and may access the memory 3220 to execute instructions and/or data loaded in the memory 3220. The memory 3220 may include at least one of a double data rate (DDR) synchronous dynamic random access memory (SDRAM), a high bandwidth memory (HBM), a hybrid memory cube (HMC), a dual in-line memory module (DIMM), an Optane DIMM, a non-volatile DIMM (NVDIMM), etc. The number of the processors 3210 and the number of the memories 3220 included in the storage server 3200 may be variously selected according to embodiments.

In one embodiment, the processor 3210 and the memory 3220 may provide a processor-memory pair. In one embodiment, the number of the processors 3210 and the number of the memories 3220 may be different from each other. The processor 3210 may include a single core processor or a multiple core processor. The above description of the storage server 3200 may be similarly applied to the application server 3100. In some embodiments, the application server 3100 may not include the storage device 3150. The storage server 3200 may include at least one storage device 3250. The number of the storage devices 3250 included in the storage server 3200 may be variously selected according to example embodiments.

The application servers 3100 to 3100n and the storage servers 3200 to 3200m may communicate with each other through a network 3300. The network 3300 may be implemented using a fiber channel (FC) or an Ethernet. In this case, the FC may be a medium used for a relatively high speed data transmission, and an optical switch that provides high performance and/or high availability may be used. The storage servers 3200 to 3200m may be provided as file storages, block storages, or object storages according to an access scheme of the network 3300.

In one embodiment, the network 3300 may be a storage-only network or a network dedicated to a storage, such as a storage area network (SAN). For example, the SAN may be an FC-SAN that uses an FC network and is implemented according to an FC protocol (FCP). For another example, the SAN may be an IP-SAN that uses a transmission control protocol/internet protocol (TCP/IP) network and is implemented according to an iSCSI (a SCSI over TCP/IP or an Internet SCSI) protocol. In another example, the network 3300 may be a general or normal network such as the TCP/IP network. For example, the network 3300 may be implemented according to at least one of protocols, such as an FC over Ethernet (FCoE), a network attached storage (NAS), a non-volatile memory express (NVMe) over Fabrics (NVMe-oF), etc.

Hereinafter, a description will be given focusing on the application server 3100 and the storage server 3200. The description of the application server 3100 may be applied to the other application server 3100n, and the description of the storage server 3200 may be applied to the other storage server 3200m.

The application server 3100 may store data requested to be stored by a user or a client into one of the storage servers 3200 to 3200m through the network 3300. In addition, the application server 3100 may receive data requested to be read by the user or the client from one of the storage servers 3200 to 3200m through the network 3300. For example, the application server 3100 may be implemented as a web server or a database management system (DBMS).

The application server 3100 may access a memory 3120n or a storage device 3150n included in the other application server 3100n through the network 3300, and/or may access the memories 3220 to 3220m or the storage devices 3250 to 3250m included in the storage servers 3200 to 3200m through the network 3300. Therefore, the application server 3100 may perform various operations on data stored in the application servers 3100 to 3100n and/or the storage servers 3200 to 3200m. For example, the application server 3100 may execute a command for moving or copying data between the application servers 3100 to 3100n and/or the storage servers 3200 to 3200m. The data may be communicated from the storage devices 3250 to 3250m of the storage servers 3200 to 3200m to the memories 3120 to 3120n of the application servers 3100 to 3100n directly or through the memories 3220 to 3220m of the storage servers 3200 to 3200m. For example, the data communicated through the network 3300 may be encrypted data for security or privacy.

In the storage server 3200, an interface 3254 may provide a physical connection between the processor 3210 and a controller 3251 and/or a physical connection between a network interface card (NIC) 3240 and the controller 3251. For example, the interface 3254 may be implemented based on a direct attached storage (DAS) scheme in which the storage device 3250 is directly connected with a dedicated cable. For example, the interface 3254 may be implemented based on at least one of various interface schemes, such as an advanced technology attachment (ATA), a serial ATA (SATA), an external SATA (e-SATA), a small computer system interface (SCSI), a serial attached SCSI (SAS), a peripheral component interconnection (PCI), a PCI express (PCIe), an NVMe, an IEEE 1394, a universal serial bus (USB), a secure digital (SD) card interface, a multi-media card (MMC) interface, an embedded MMC (eMMC) interface, a universal flash storage (UFS) interface, an embedded UFS (eUFS) interface, a compact flash (CF) card interface, etc.

The storage server 3200 may further include a switch 3230 and the NIC 3240. The switch 3230 may selectively connect the processor 3210 with the storage device 3250 or may selectively connect the NIC 3240 with the storage device 3250 under the control of the processor 3210.

In one embodiment, the NIC 3240 may include a network interface card, a network adapter, or the like. The NIC 3240 may be connected to the network 3300 through a wired interface, a wireless interface, a Bluetooth interface, an optical interface, or the like. The NIC 3240 may further include an internal memory, a digital signal processor (DSP), a host bus interface, or the like, and may be connected to the processor 3210 and/or the switch 3230 through the host bus interface. The host bus interface may be implemented as one of the above-described examples of the interface 3254. In one embodiment, the NIC 3240 may be integrated with at least one of the processor 3210, the switch 3230, and the storage device 3250.

In the storage servers 3200 to 3200m and/or the application servers 3100 to 3100n, the processor may transmit a command to the storage devices 3150 to 3150n and 3250 to 3250m or the memories 3120 to 3120n and 3220 to 3220m to program or read data. At this time, the data may be error-corrected data by an error correction code (ECC) engine. For example, the data may be processed by a data bus inversion (DBI) or a data masking (DM), and may include a cyclic redundancy code (CRC) information. For example, the data may be encrypted data for security or privacy.

The storage devices 3150 to 3150m and 3250 to 3250m may transmit a control signal and command/address signals to NAND flash memory devices 3252 to 3252m in response to a read command received from the processor. When data is read from the NAND flash memory devices 3252 to 3252m, a read enable (RE) signal may be input as a data output control signal and may serve to output data to a DQ bus. A data strobe signal (DQS) may be generated using the RE signal. The command and address signals may be latched in a page buffer based on a rising edge or a falling edge of a write enable (WE) signal.

The controller 3251 may control the overall operations of the storage device 3250. In one embodiment, the controller 3251 may include a static random access memory (SRAM). The controller 3251 may write data into the NAND flash memory device 3252 in response to a write command, or may read data from the NAND flash memory device 3252 in response to a read command. For example, the write command and/or the read command may be provided from the processor 3210 in the storage server 3200, the processor 3210m in the other storage server 3200m, or the processors 3110 and 3110 n in the application servers 3100 and 3100n. A DRAM 3253 may temporarily store (e.g., may buffer) data to be written to the NAND flash memory device 3252 or data read from the NAND flash memory device 3252. Further, the DRAM 3253 may store metadata. The metadata may be data generated by the controller 3251 to manage user data or the NAND flash memory device 3252. The storage device 3250 may include a secure element for security or privacy.

In some embodiments, the storage devices 3150 and 3250 may perform the operations described above. That is, the storage devices 3150 and 3250 may each change mapping information of the mapping table 214a of LPNs and PPNs between the processor 213 and the FTL 214 through the accelerator 219 included in each of the storage devices 3150 and 3250 and may change continuity information of the mapping information.

While the inventive concept has been shown and described with reference to exemplary embodiments thereof, it will be apparent to those of ordinary skill in the art that various changes in form and details may be made thereto without departing from the spirit and scope of the inventive concept as set forth by the appended claims.

What is claimed:

1. A storage device comprising:
a non-volatile memory; and
a storage controller including a processor, an accelerator and a memory storing a flash translation layer including a mapping table, the mapping table comprising first to $N^{th}$ mapping table entries indexed by logical page numbers, and including mapping information between the logical page numbers and physical page numbers,
wherein the processor is configured to provide a command to the non-volatile memory and provide first mapping update information in a first mapping update size to the accelerator, and
the accelerator is configured to update the mapping information so as to indicate changed physical page numbers corresponding to the logical page numbers and to check continuity for the first mapping update information, and when the mapping information of the first to $N^{th}$ mapping table entries exceeds the first mapping update size, the accelerator is further configured to change continuity information for the first mapping update information by reading the mapping table entries in a reverse order from an $(N-1)^{th}$ mapping table entry.

2. The storage device of claim 1, wherein the processor is configured to set the first mapping update size.

3. The storage device of claim 1, wherein the accelerator is further configured to simultaneously update the mapping information for logical page numbers and check continuity for the first mapping update information.

4. The storage device of claim 1, wherein the first mapping update information indicates changed physical page numbers corresponding to logical page numbers and corresponding addresses of the mapping table.

5. The storage device of claim 4, wherein
mapping information of the mapping table entries corresponding to a first logical page number and a second logical page number among the first to $N^{th}$ mapping table entries is updated according to the first mapping update information.

6. The storage device of claim 5, wherein the accelerator is further configured to perform a continuity check on the mapping information of the mapping table entries corresponding to the first logical page number and the second logical page number within the first mapping update size.

7. The storage device of claim 5, wherein the accelerator is further configured to write mapping information of the first to $(N-1)^{th}$ mapping table entries updated in accordance with the first mapping update information to the mapping table.

8. The storage device of claim 1, wherein the accelerator is further configured to communicate updated information of the mapping table to the processor.

9. The storage device of claim 1, wherein
the processor further provides second mapping update information including a second mapping update size different from the first mapping update size to the accelerator, and
the accelerator is further configured to check continuity of the second mapping update information.

10. The storage device of claim 1, wherein the accelerator comprises:
a mapping table address calculator configured to calculate an address to be accessed in the mapping table using the first mapping update provided by the processor;
a continuity checker configured to check continuity of physical page numbers of the updated mapping information;
a physical page number updater configured to update mapping information for changed physical page numbers; and
a memory interface configured to access the mapping table.

11. A storage device comprising:
a non-volatile memory; and
a storage controller including a processor, an accelerator and a memory storing a flash translation layer including a mapping table including mapping information between logical page numbers and physical page numbers,
wherein the processor is configured to provide a command to the non-volatile memory and provide first mapping update information in a first mapping update size to the accelerator,
the mapping table includes first to $N^{th}$ mapping table entries indexed by the logical page numbers,
the accelerator is configured to read the first to $N^{th}$ mapping table entries, and
upon updating the mapping information of the mapping table, the accelerator is further configured to update mapping information corresponding to a first logical page number and a second logical page number in the first mapping update information included in the first mapping update size, and check continuity of first mapping update information,
wherein when mapping information of the first to $N^{th}$ mapping table entries exceeds the first mapping update size, the accelerator is further configured to change continuity information for the first mapping update information by reading mapping table entries in a reverse order from an $(N-1)^{th}$ mapping table entry.

12. The storage device of claim 11, wherein the accelerator is further configured to perform continuity check for the mapping information of the mapping table entries that correspond to the first and the second logical page numbers within the first mapping update size.

13. The storage device of claim 11, wherein the processor is further configured to set the first mapping update size.

14. The storage device of claim 11, wherein the accelerator is further configured to simultaneously update the mapping information and check the continuity.

15. The storage device of claim 11, wherein the processor is further configured to communicate first mapping update information associated with changed physical page numbers corresponding to the first logical page number and the second logical page number and corresponding addresses of the mapping table to the accelerator.

16. A method of operating a storage device, the method comprising:
communicating first mapping update information included in a first mapping update size to an accelerator using a processor,
accessing a mapping table including first to $N^{th}$ mapping table entries using the accelerator,
determine whether mapping information of the first to $N^{th}$ mapping table entries included in the mapping table exceeds the first mapping update size using the accelerator, and
checking continuity of the first mapping update information by reading the mapping table entries in a reverse order from an $(N-1)^{th}$ mapping table entry when the mapping information of the first to $N^{th}$ mapping table entries exceed the first mapping update size using the accelerator.

17. The method of claim 16, further comprising:
accessing the mapping table and issuing a data request related to the mapping information of the first to $(N-1)^{th}$ mapping table entries using the accelerator; and
receiving data in the accelerator related to the mapping information of the first to $(N-1)^{th}$ mapping table entries from the mapping table.

18. The method of claim 16, further comprising:
updating mapping information of the mapping table entries corresponding to a first logical page number and a second logical page number according to the first mapping update information; and
performing a continuity check on the mapping information of the mapping table entries corresponding to the first logical page number and the second logical page number within the first mapping update size using the accelerator.

19. The method of claim 16, further comprising:
writing mapping information of the first to $(N-1)^{th}$ mapping table entries updated according to the first mapping update information to the mapping table using the accelerator; and
communicating updated information of the mapping table to the processor using the accelerator.

* * * * *